(12) United States Patent
Marcum

(10) Patent No.: US 6,286,269 B1
(45) Date of Patent: Sep. 11, 2001

(54) PREFABRICATED SHOOTING HOUSE

(76) Inventor: G. Michael Marcum, 14843 Hwy. 140, Coker, AL (US) 35452-3418

( * ) Notice: Subject to any disclaimer, the term of this patent is extended or adjusted under 35 U.S.C. 154(b) by 0 days.

(21) Appl. No.: 09/542,486

(22) Filed: Apr. 3, 2000

(51) Int. Cl.[7] ............................. E04H 1/12; A01M 31/00
(52) U.S. Cl. ............................. 52/79.5; 52/79.9; 52/270; 52/284; 52/745.2; 135/901; 43/1
(58) Field of Search ....................... 135/87, 901; 52/79.1, 52/79.5, 79.9, 270, 284, 745.2; 43/1

(56) References Cited

U.S. PATENT DOCUMENTS

| | | | |
|---|---|---|---|
| D. 373,403 | * | 9/1996 | Hall ..................... 135/901 X |
| 2,854,704 | * | 10/1958 | McClaren . |
| 2,952,799 | * | 9/1960 | Wortman et al. ............... 52/284 X |
| 3,018,857 | * | 1/1962 | Parham ..................... 135/901 X |
| 3,373,533 | * | 3/1968 | Trelfa et al. ..................... 52/284 X |
| 3,486,285 | * | 12/1969 | Bowling et al. ..................... 52/284 |
| 3,854,746 | * | 12/1974 | Flynn et al. ..................... 135/901 X |
| 4,631,877 | | 12/1986 | Molodecki ..................... 52/70 |
| 4,843,788 | * | 7/1989 | Gavin et al. ..................... 52/79.1 X |
| 4,893,445 | * | 1/1990 | Hefer et al. ..................... 52/284 X |
| 5,062,234 | | 11/1991 | Green ..................... 43/1 |
| 5,210,984 | * | 5/1993 | Eckel ..................... 52/79.5 |
| 5,377,711 | | 1/1995 | Mueller ..................... 135/87 |
| 5,513,471 | | 5/1996 | Worms et al. ..................... 52/82 |
| 5,762,085 | | 6/1998 | Punch ..................... 135/93 |
| 5,862,827 | * | 1/1999 | Howze ..................... 135/901 |
| 6,009,673 | | 1/2000 | Adams ..................... 52/79.1 |

* cited by examiner

Primary Examiner—Robert Canfield
(74) Attorney, Agent, or Firm—Choate, Hall & Stewart

(57) ABSTRACT

A prefabricated shooting house is disclosed which can be easily assembled and disassembled from a position within the volume enclosed by the shooting house. The prefabricated package includes four rectangular side panels and a square top panel or roof, and requires no additional coloring or finish work. Assembly of the shooting house involves positioning four side panels, affixing three of the panels to adjoining side panels and a separately constructed bottom portion, positioning the top panel by raising it through the body diagonal of the house, and finally affixing the remaining side panel and top panel.

5 Claims, 8 Drawing Sheets

PREFABRICATED SHOOTING HOUSE

FIELD OF THE INVENTION

This invention relates to the field of hunting shelters and more particularly to a prefabricated shooting house.

BACKGROUND OF THE INVENTION

It has long been recognized that hunters must remain unnoticed as they await their prey. Camoflaughed clothing is one conventional method for blending into one's surroundings; however, this method does not conceal movements or scents of the hunter and provides little protection from inclement weather or temperatures. Accordingly, these issues have been addressed in the prior art through the development of hunting shelters or blinds. Typically, such hunting shelters involve a frame over which is applied a flexible covering material such as canvas or tarpaulin (see, e.g. U.S. Pat. No. 5,762,085 to Punch, U.S. Pat. No. 5,377,711 to Mueller, and U.S. Pat. No. 5,062,234 to Green). These shelters, however, are generally unsuitable for long-term exposure in the wilderness due to degradation of the flexible covering material. In addition, such structures are generally not particularly effective at protecting hunters from inclement weather and temperatures.

Still other hunting shelters, or similar type huts for wildlife observation or ice fishing, include walls made of rigid panels (see, e.g. U.S. Pat. No. 6,009,673 to Adams, U.S. Pat. No. 5,513,471 to Worms et al., and U.S. Pat. No. 4,631,877 to Molodecki). Such structures, however, are generally not easily assembled and disassembled and are often difficult to transport to and from locations. Additionally, it is often necessary that a hunting structure be constructed off the ground, in a tree or otherwise up in the air, in order for a hunter to remain unnoticed and have a better view of the surrounding countryside. Conventional hunting shelters are generally not designed to be readily accessible in such situations.

There is, therefore, a need for a prefabricated hunting shelter or shooting house that can be readily transported, be easily assembled and disassembled, be easily accessible when placed off the ground, allow a clear view of the surrounding environment, conceal a hunter from prey, and still provide protection from inclement weather and temperatures.

SUMMARY OF THE INVENTION

It is one aspect of the invention to provide an easily transportable, prefabricated enclosure consisting of four substantially identical side rectangular panels and a top panel. Each side panel has a 45 degree lip running along each interior length edge, a 90 degree lip that is flush with the lower interior width edge, and a 90 degree lip running parallel but recessed from the upper interior width edge. The top panel has a 90 degree lip running parallel but recessed from each interior edge. Furthermore, the top panel has square dimensions with the length of one side measuring greater than the width of a side panel but less than the diagonal measurement of the cross-sectional area enclosed by the side panels.

It is another aspect of the invention to allow a clear view of the surrounding environment by providing windows and window covers in one or more of the side panels that can be opened and latched from the inside.

It is yet another aspect of the invention to provide a shooting house that can be easily accessed by a hunter through one or more doors in the side panels. A door handle is located within 18" of the bottom of a door, such that if the shooting house is assembled off the ground, the hunter can readily reach up from a position below the shooting house and open the door without blocking the door with his or her body.

It is still another aspect of the invention to provide a method of easily assembling and disassembling a shooting house. A method for constructing a shooting house is disclosed comprising the steps of choosing a location for assembly of the shooting house, and assembling the shooting house from a position that is within the volume to be enclosed by the shooting house. The choice of location includes deciding which direction one or more of the doors in the shooting house will face, and whether the house is to be constructed on or off the ground. The assembling of the shooting house includes positioning four side panels; affixing three of the side panels to the floor and adjoining side panels; positioning a top panel on top of the shooting house; affixing the fourth side panel to the floor and adjoining side panels; and affixing the top panel to all side panels. The positioning of the top panel includes bringing the top panel through a door; aligning the top panel along the body diagonal of the shooting house; raising the top panel from the body diagonal to the top of the shooting house; and matching an attached lip on the top panel with an attached lip on each side panel.

BRIEF DESCRIPTION OF THE DRAWING

The invention is described with reference to the several figures of the drawing, in which.

DESCRIPTION OF THE PREFERRED EMBODIMENT

Figure 1:
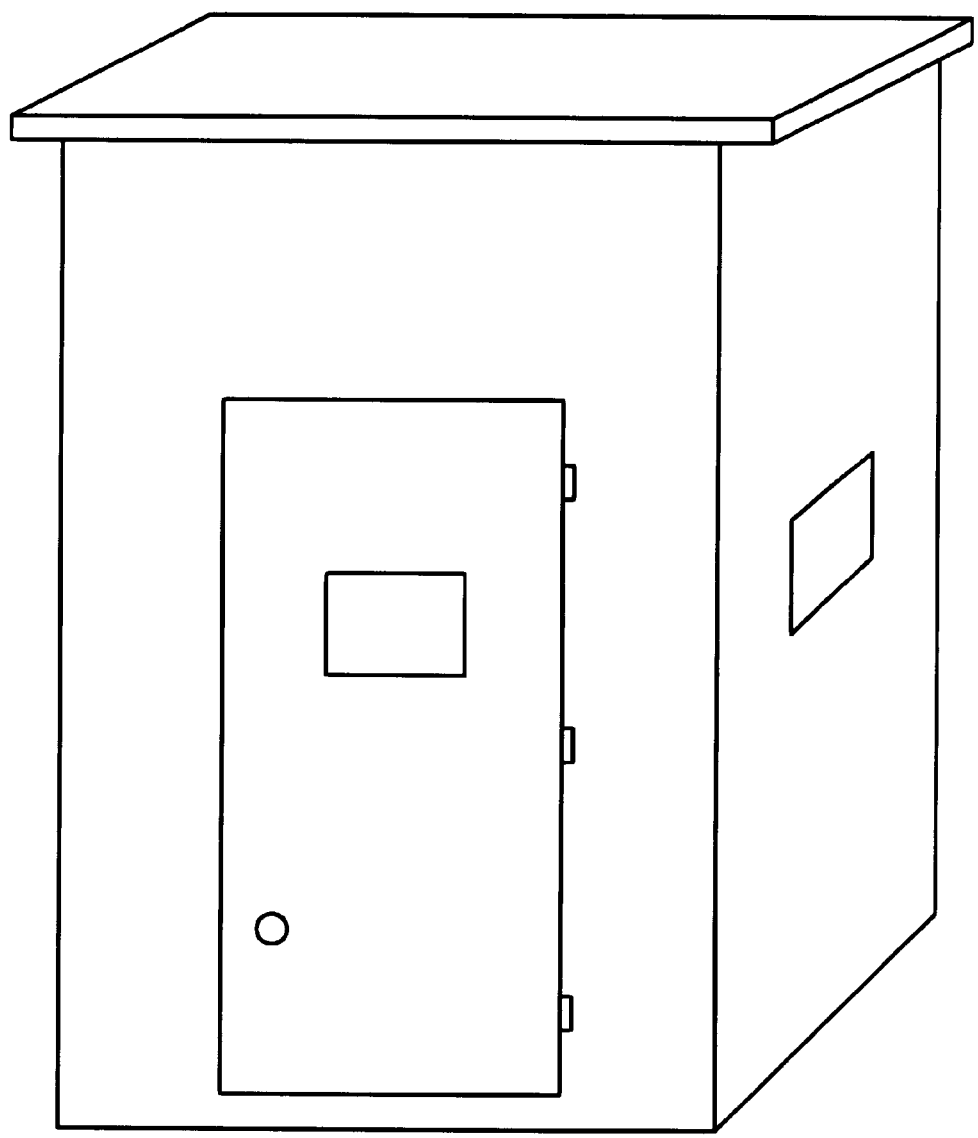
FIG. 1 is an exterior view in perspective of the back and side of the invention.

With reference now to the figures of the drawing, the preferred embodiment of the shooting house will be described. The dimensions listed are entirely exemplary and are not limiting. The embodiment of a side panel or wall is generally designated by the reference numeral 10.

FIG. 1 provides a view in perspective of the back and side of the shooting house, illustrating its overall design and appearance. The house is constructed from a prefabricated package consisting of four rectangular side panels, and a top panel or roof; a bottom portion or floor must be separately constructed by the user. Such panels would typically consist of pre-colored fiberglass or plastic material, but could also include wood, metal or any other suitable materials, that require no painting or finish work in order to maximize the ease of assembly. Affixing these pieces is generally done with bolts and screws. The design of the shooting house is such that it be can constructed from a position entirely within the volume that is to be enclosed by the shooting house.

Figure 2:
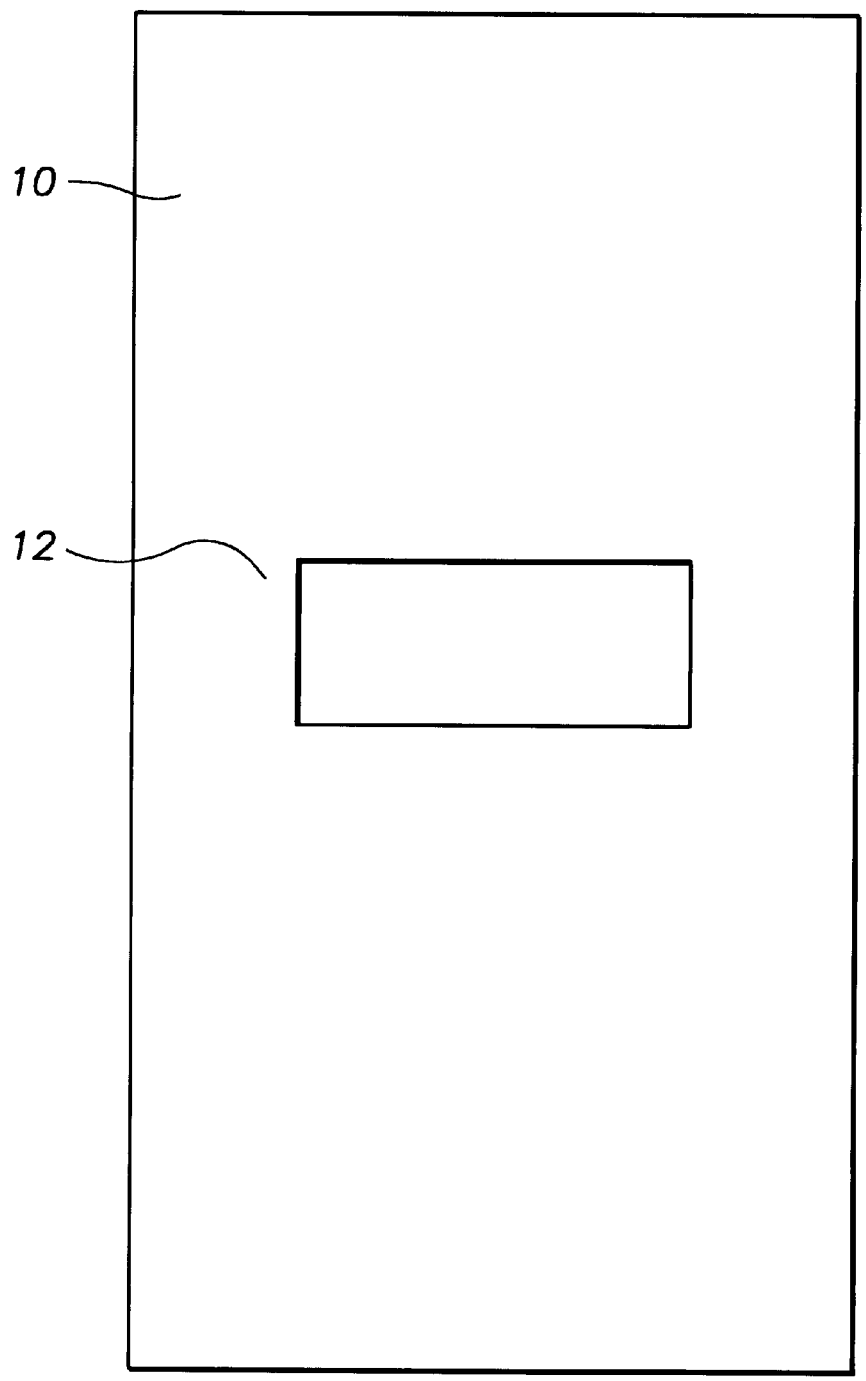
FIG. 2 is an exterior view of the front or side of the invention with measurements for one embodiment shown.
Figure 3:
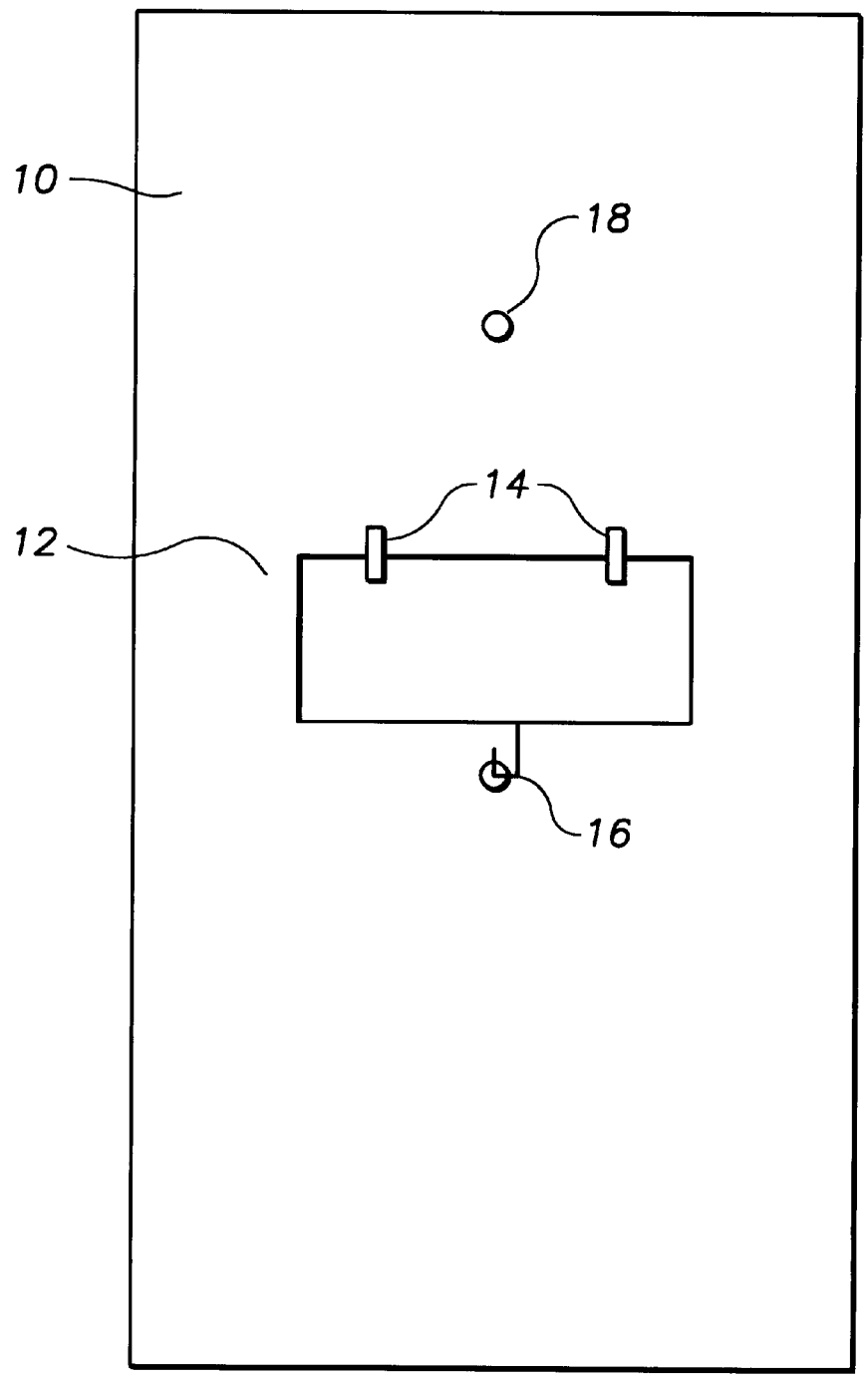
FIG. 3 is an interior view of the front or side of the invention with measurements for one embodiment shown.

With reference to FIGS. 2 and 3, a side panel 10 is shown with a window 12. FIG. 2 provides measurements for the location and dimension of a typical window found in one or more of the side panels. The side panel 10 measures 44" by 6'10" with the window 12 measuring 24" by 10" and located 39" inches from the bottom width edge, 33" from the top width edge, and 10" from each side length edge. Looking from an interior view, FIG. 3. shows that a window cover can be attached by two hinges 14 on the inside that allow it to be folded up from the inside. The window cover can be kept closed by a latch 16 or held open by a latch 18. The window cover can be made of opaque or transparent material.

Figure 4:
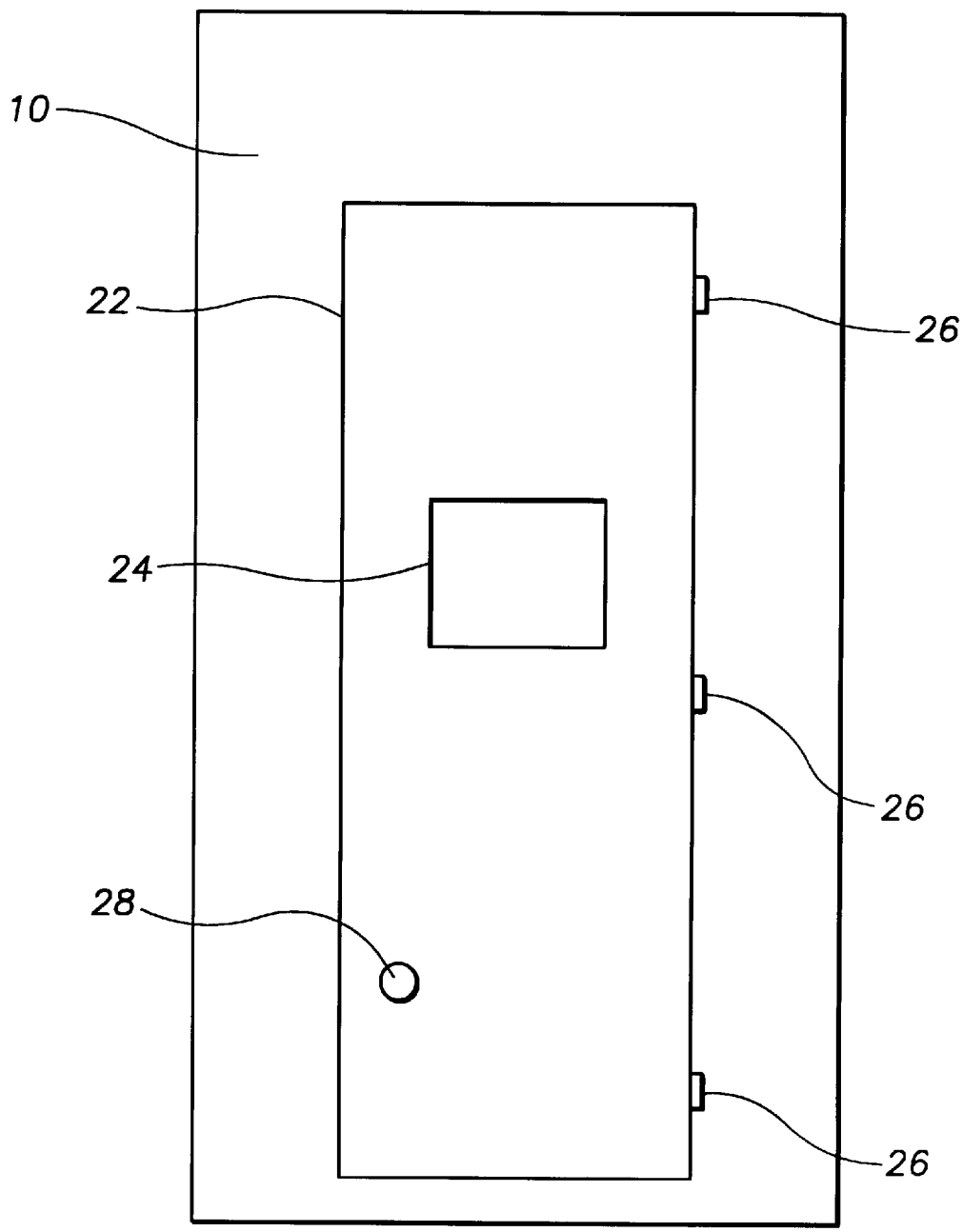
FIG. 4 is an exterior view of the back of the invention with measurements for one embodiment shown.
Figure 5:
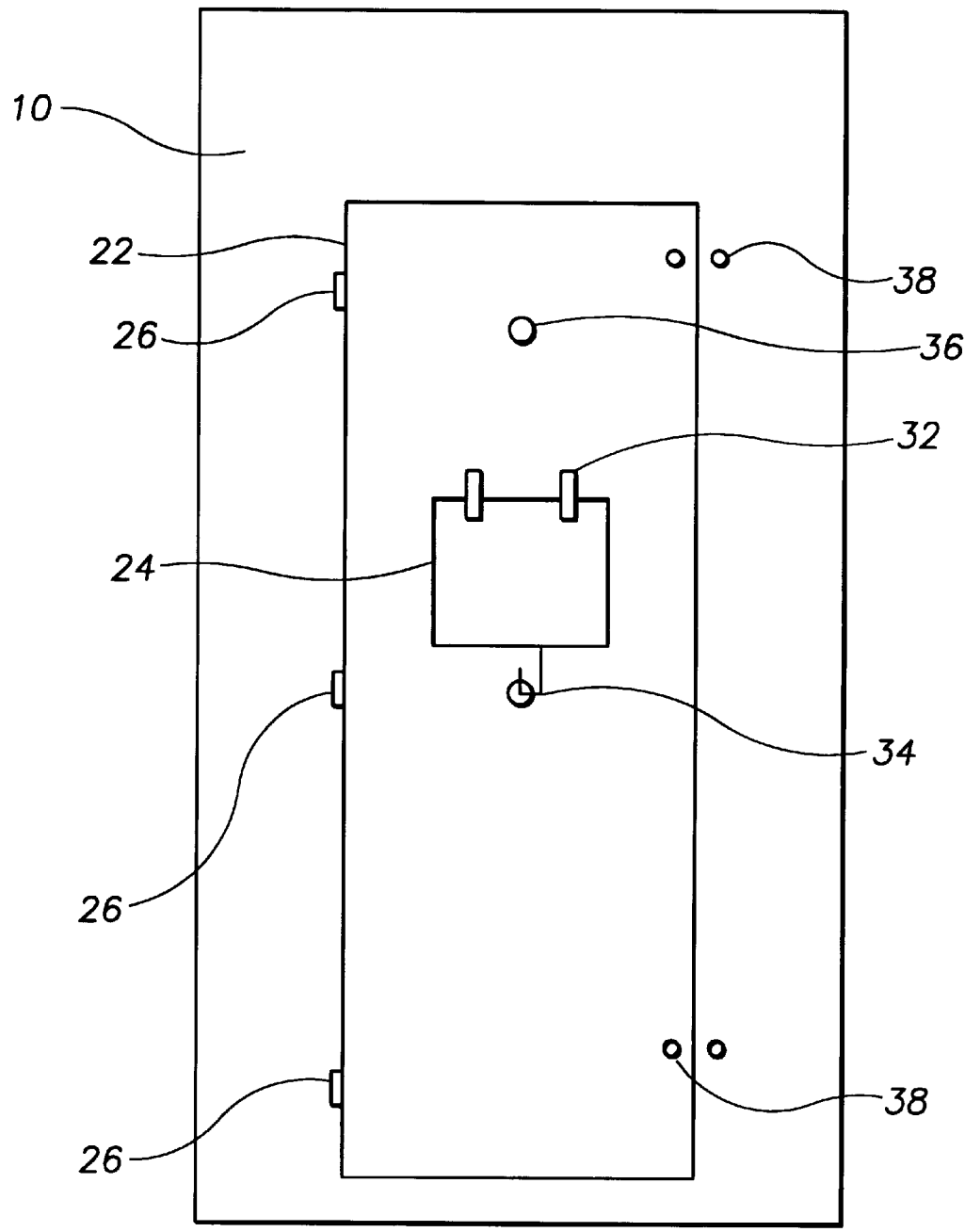
FIG. 5 is an interior view of the back of the invention with measurements for one embodiment shown.

FIG. 4 provides an exterior back view of the shooting house and shows a side panel 10 into which a door 22 has been added. The door 22 is attached to the side panel 10 by three hinges 26. The door 22 measures 24" by 5'10" and is located 3" from the bottom width edge, 13" from the top width edge and 10" from each side length edge. A window 24 has been added to the door, measuring 12" by 10" and located 36" from the bottom of the door and 6" from either side of the door. A door handle 28 is located 12" from the bottom of the door 22 but could potentially be placed anywhere within 18" from the bottom of the door. Placement of the door handle 28 in such a position allows easy access to the shooting house when it is located off the ground. A hunter, who must climb up to the shooting house, is able to enter the house by reaching up and opening the door without blocking the door with his or her body. The interior back view shown in FIG. 5 illustrates that a window cover is attached to door 22 by hinges 32 on the inside so that the window cover can be opened from the inside. The window cover can be kept closed by a latch 34 or held open by a latch 36. Door 22 can be kept closed from the inside by latches 38, located inside near the top and bottom of the door.

Figure 6:
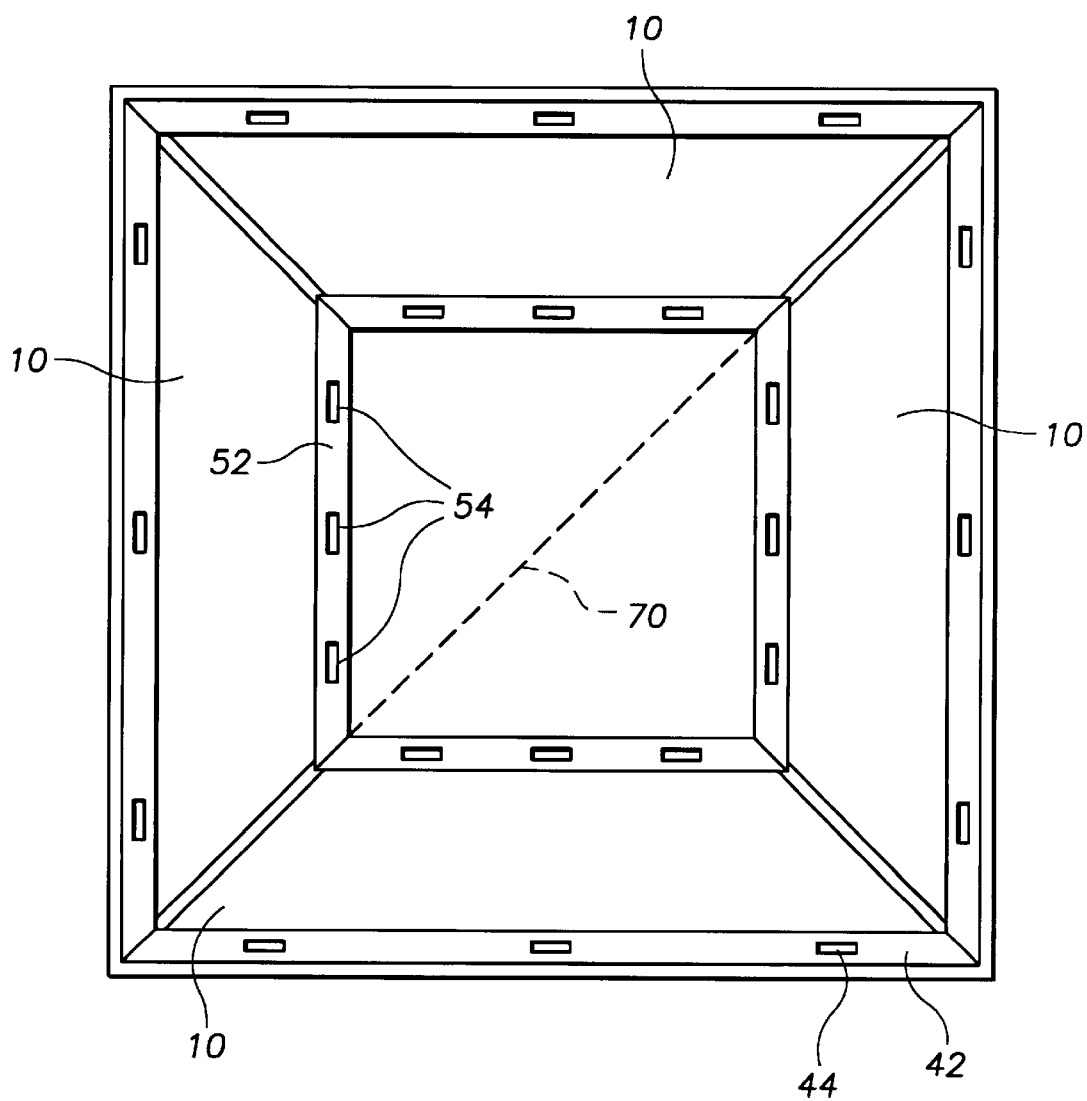
FIG. 6 is an interior top-to-bottom view of the invention with the top and bottom lip attachments shown.

FIG. 6 shows an interior top-down view of the shooting house. The top panel of the shooting house is connected to the side panels via a lip 42 located on each side panel at 2.5" from the top edge and jutting out 2.5". Each side edge of the lip must be cut at a 45 degree angle in order to fit properly with the lips on the other side panels. In the top lip of each side panel are three 1" slots 44 that are used for bolting the top panel to the sides. The bottom of each side panel is similar to the top, having a lip 52 with three 1" slots 54. This bottom lip 52, however, is located flush with the lower width edge of each side panel so as to enable the securing of the side panels to the floor. For strength and stability, the bottom lips should measure 3" to 3.5" wide. The process of securing the side panels to the floor will typically be done with screws. The floor is not part of the prefabricated enclosure package; it must be separately constructed by the user of the shooting house and can be made of plastic, fiberglass, wood, concrete, metal or any other suitable material depending on the area in which the shooting house will be placed and the desired permanence. For ease of assembly and transportation, a suitable bottom portion could be constructed out of treated wood boards measuring 2" by 6" or 2" by 8".

Figure 7A:
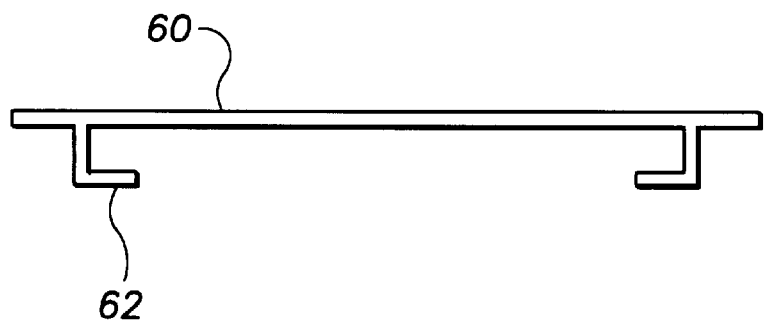
FIGS. 7A and 7B are side views of the top showing top lip attachments and connection of the top and side lip attachments.
Figure 7B:
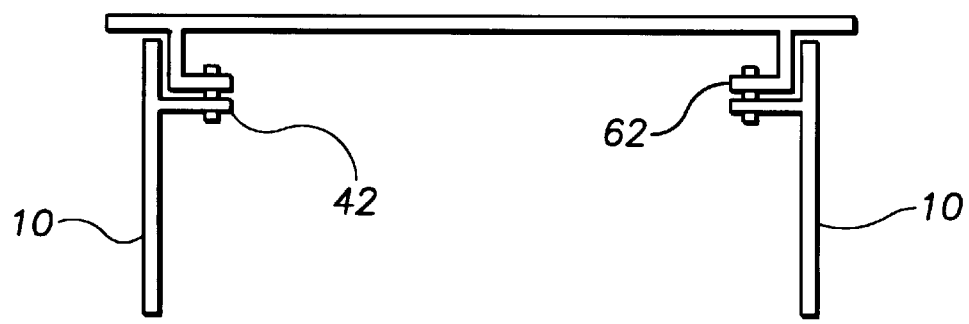

FIGS. 7A and 7B illustrate the connection of a top panel 60 to the side panels 10. During assembly, the top panel 60 is brought in through the door 22 and held along the diagonal 70 of the shooting house (see FIGS. 5 and 6). In the case of each side panel measuring 44" in width, the diagonal 70 measures approximately 62.5". An appropriately dimensioned top panel, that is, one side of the top panel measuring greater than the width of a side panel but less than the diagonal measurement of the cross-sectional area enclosed by the side panels, can therefore be placed on top by being lifted from the inside along the body diagonal of the shooting house. In the example provided, FIG. 7A depicts a top panel which measures 46 inches square which is appropriately dimensioned by measuring less than 62.5" (the length of the diagonal) but greater than 44" (the length of each side panel). The top panel 60 has a 2.5" lip 62 along each side, appearing like an "L", that extends 2.5" inches below each edge of the top panel and is recessed by at least more than 1", in this case 2.5". FIG. 7B shows that the top panel lip 62 fits onto each side panel lip 42 leaving a 1" overhang of the top panel over the side panels.

Figure 8A:
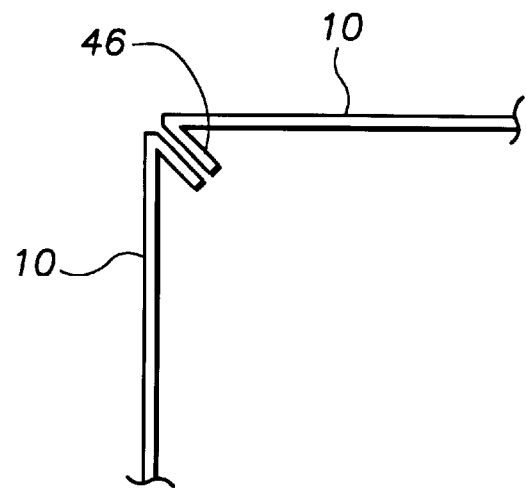
FIGS. 8A and 8B are side views showing the connection of the side walls with measurements for one embodiment shown.
Figure 8B:
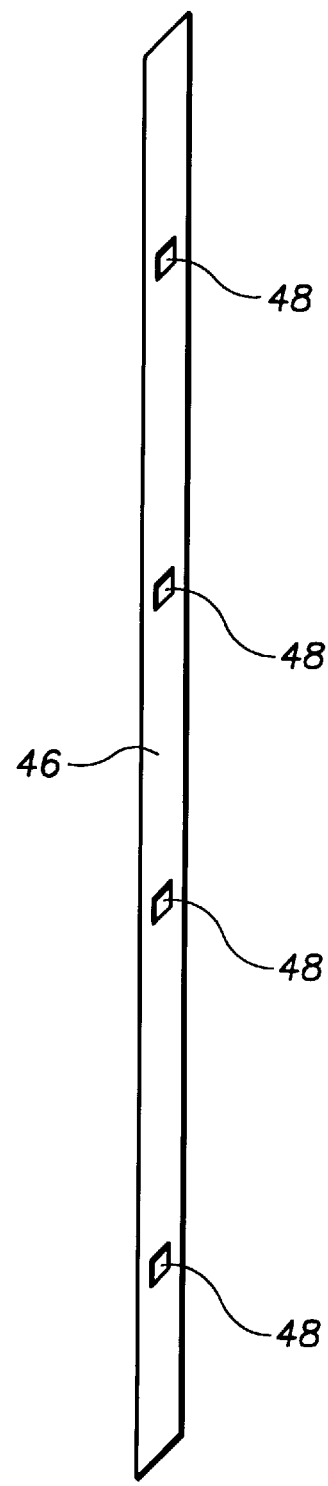

The connection of the side panels is shown in FIGS. 8A and 8B. FIG. 8A shows that on each length side of each side panel is a 45 degree lip 46 that allows one side panel to sit flush with the lip of an adjoining side panel. FIG. 8B shows that along each 45 degree lip 46 are four slots 48 spaced along the length of the side panel that allow adjoining side panels to be bolted together.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A prefabricated enclosure consisting of:

four substantially identical side rectangular panels, each of said side panels having a 45 degree lip on each interior length edge, a 90 degree lip that is flush with the lower interior width edge, and a 90 degree lip running parallel but recessed from the upper interior width edge; and a top panel, said top panel having a 90 degree lip running parallel but recessed from each interior edge, and said top panel having square dimensions with the length of one side measuring greater than the width of a side panel but less than the diagonal measurement of the cross-sectional area enclosed by the side panels.

2. The enclosure of claim 1 wherein one or more of the side panels has a window and window cover.

3. The enclosure of claim 1 or 2 wherein one or more of the side panels has a door.

4. The enclosure of claim 3 wherein a door handle is located within 18 inches of the lower exterior width edge.

5. A method for constructing a shooting house comprising the steps of:

choosing a location for assembly of the shooting house, said choice including:

a decision as to which direction one or more of the doors will face; and a decision as to whether the shooting house will be constructed on or off the ground; and assembling the shooting house from a position that is within the volume to be enclosed by the shooting house, said assembly including:

positioning four side panels;
affixing three of the side panels to a floor and adjoining side panels;
positioning a top panel on top of the shooting house;
affixing the fourth side panel to the floor and adjoining side panels; and
affixing the top panel to all side panels;
wherein said positioning of the top panel includes:
bringing said top panel through a door;
aligning said top panel along the body diagonal of the shooting house;
raising said top panel from the body diagonal to the top of the shooting house; and
matching an attached lip on the top panel with an attached lip on each side panel.

* * * * *